United States Patent
Griswold, Jr. et al.

(10) Patent No.: US 7,827,261 B1
(45) Date of Patent: Nov. 2, 2010

(54) SYSTEM AND METHOD FOR DEVICE MANAGEMENT

(75) Inventors: Robert M. Griswold, Jr., Round Rock, TX (US); Joseph M. Hill, III, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 826 days.

(21) Appl. No.: 11/021,932

(22) Filed: Dec. 22, 2004

(51) Int. Cl.
*G06F 15/16* (2006.01)

(52) U.S. Cl. ..................................... 709/223

(58) Field of Classification Search ................. 709/223, 709/224
See application file for complete search history.

(56) References Cited

U.S. PATENT DOCUMENTS

| | | | |
|---|---|---|---|
| 6,041,381 A | 3/2000 | Hoese | |
| 6,151,331 A | 11/2000 | Wilson | |
| 6,341,315 B1 | 1/2002 | Arroyo et al. | |
| 6,400,730 B1 | 6/2002 | Latif et al. | |
| 6,421,753 B1 | 7/2002 | Hoese et al. | |
| 6,425,035 B2 | 7/2002 | Hoese et al. | |
| 6,425,036 B2 | 7/2002 | Hoese et al. | |
| 6,769,022 B1 * | 7/2004 | DeKoning et al. | 709/223 |
| 7,213,026 B2 * | 5/2007 | Evans et al. | 707/101 |
| 2001/0054093 A1 | 12/2001 | Iwatani | |
| 2002/0059439 A1 | 5/2002 | Arroyo et al. | |
| 2002/0062387 A1 | 5/2002 | Yatziv | |
| 2002/0083120 A1 | 6/2002 | Soltis | |
| 2002/0091809 A1 | 7/2002 | Menzies et al. | |
| 2002/0124094 A1 * | 9/2002 | Chang et al. | 709/230 |
| 2002/0174198 A1 * | 11/2002 | Halter | 709/220 |
| 2003/0140119 A1 * | 7/2003 | Acharya et al. | 709/219 |
| 2005/0165756 A1 * | 7/2005 | Fehse | 707/3 |

* cited by examiner

*Primary Examiner*—William C Vaughn, Jr.
*Assistant Examiner*—Scott Christensen
(74) *Attorney, Agent, or Firm*—Sprinkle IP Law Group

(57) ABSTRACT

Embodiments of the present invention provide a system and method of device management. In one embodiment of the present invention, a management device can receive device management data from devices on a network in a variety of device management protocols and map the device management data to a protocol used by a device management client. Because the management device can provide device management data in a format usable by the device management client, regardless of which protocol was originally used to generate the device management data, the device management client can turn to the management device to gather all or a portion the device management data from heterogeneous devices on a network.

16 Claims, 3 Drawing Sheets

SYSTEM AND METHOD FOR DEVICE MANAGEMENT

TECHNICAL FIELD OF THE INVENTION

The present invention relates to device management. More particularly, the present invention relates to systems and methods for providing device management for devices using various device management protocols.

BACKGROUND

Data represents a significant asset for many entities. Consequently, data loss, whether accidental or caused by malicious activity, can be costly in terms of wasted manpower, loss of goodwill from customers, loss of time and potential legal liability. In order to provide proper protection of data for business and legal purposes (e.g., to ensure quick recovery of data in the event of a disaster or to comply with document retention requirements), entities often back up data on a regular basis. Many entities have now implemented storage area networks ("SAN") to relieve much of the burden of mass data storage and backup from the respective entity's local area network ("LAN"), freeing the LAN for more immediate data storage and manipulation operations.

Many SAN storage devices read/write data for storage purposes over the fibre channel SAN but provide management data, usually according to the simple network management protocol ("SNMP"), over TCP networks through built-in Ethernet connections. Other storage devices use in-band or special encapsulated storage commands to communicate management data over fibre channel networks. Device management is controlled by management agents or management applications running on SAN hosts or dedicated systems that receive device management data from and issue device management commands to the SAN storage devices.

In order to detect and communicate with various devices within a SAN, management clients currently integrate industry standard and proprietary management information base ("MIB") information for many different devices. Management clients must constantly update and maintain access information about a wide variety of storage devices in order to offer comprehensive management functionality to the SAN. As diversity of SAN devices that can be managed increases, the task of device management is becoming more difficult.

This difficulty is due, in part, to the fact that many SAN devices are designed to communicate management data to specifically configured management clients. If SAN devices employing different device management protocols are used, multiple management clients are typically required. Thus, in order to effectively manage SAN storage devices, an entity controlling a SAN will either have to deploy multiple, redundant, management clients, increasing costs and reducing efficiency, or limit the types of storage devices used to those that can communicate using a particular device management protocol, reducing scalability.

One solution to help alleviate these problems has been the use of management clients that provide a framework for "plug-ins" for various device management protocols. This solution, however, has several shortcomings. One such deficiency is that an entity controlling the SAN is still limited to using only SAN devices for which a plug-in has been developed.

SUMMARY OF THE INVENTION

Embodiments of the present invention provide a system and method of device management that eliminates, or at least substantially reduces, the shortcomings of prior art device management systems and methods. In one embodiment of the present invention, a management device can receive device management data from devices on a network in a variety of device management protocols and map the device management data to a protocol used by a device management client. Because the management device can provide device management data in a format usable by the device management client, regardless of which protocol was originally used to generate the device management data, the device management client can turn to the management device to gather all or a substantial portion the device management data from heterogeneous devices on a network.

One embodiment of the present invention includes a management device that provides protocol mapping between device management protocols. The management device can comprise a network interface device, a computer processor coupled to the network interface device and a memory accessible by the processor storing computer readable instructions that are executable by the processor. In one embodiment of the present invention, the computer instructions are executable to maintain knowledge of a network device on a network, maintain a defined device management protocol, determine an associated device management protocol for the network device, receive device management data from the network device in the associated device management protocol and map the received device management data to the defined device management protocol.

According to one embodiment of the present invention, the management device can include one or more additional network interface devices to connect to additional networks. For example, the management device can be connected to a fibre channel storage area network ("SAN") and an IP network (e.g., an Ethernet network). The management device can maintain knowledge of a defined device management protocol, maintain knowledge of a set of network devices on the fibre channel network, determine an associated device management protocol for each network device in the set of network devices, receive device management data from at least a portion of the set of network devices and map the received device management data to the defined device management protocol. The management device, in one embodiment of the present invention, can associate devices with device management protocols by, for example, sending command inquires to the network devices according to various device management protocols and associating each network device with the device management protocol to which it responds.

Another embodiment of the present invention includes a method for device management that comprises maintaining knowledge of a network device on a network; maintaining knowledge of a defined device management protocol; sending one or more command inquiries to the network device according to one or more device management protocols; determining an associated device management protocol for the network device according to which of the one or more command inquires the particular network device responds; receiving device management data from the network device according to the associated device management protocol; and mapping the received device management data to the defined device management protocol.

The present invention provides an advantage over prior art systems and methods of device management by enabling a client application that can only communicate using a particular device management protocol (e.g., SNMP) over a particular connection (e.g., TCP) to receive device management data communicated using any number of other device management protocols communicated over other types of connections (e.g., fibre channel).

Embodiments of the present invention provide another advantage over prior art systems of device management by allowing a device management client to query a single device for information about multiple attached storage devices.

In addition, embodiments of the present invention provide another advantage over prior art systems by allowing device management data communicated in-band to be received by a device management client that does not support in-band device management protocols.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for device management that can eliminate or reduce the need for multiple device management clients. In one embodiment of the present invention, a management device can receive device management data from devices on a network in a variety of device management protocols and map the device management data to a protocol used by a device management client (referred to as the "defined protocol"). Because the management device can provide device management data in a format usable by the device management client, regardless of which protocol was originally used to generate the device management data, the device management client can turn to the management device to gather a substantial portion of the device management data from heterogeneous devices on a network. It should be noted that while the present invention will be described primarily in terms of management of storage devices on a SAN, these embodiments are provided by way of example, but not limitation. Embodiments of the present invention can be implemented for management of various devices on a variety of networks.

Figure 1:
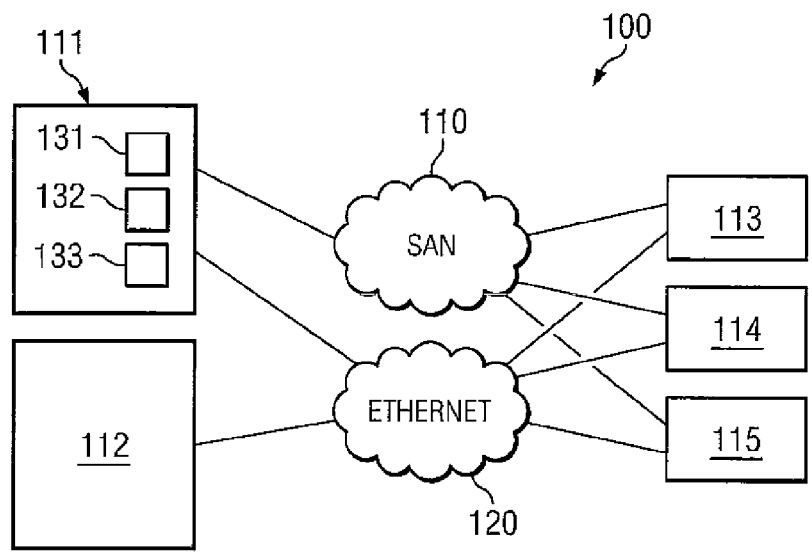
FIG. 1 is a diagrammatic representation of a conventional system for providing device management on a network.

FIG. 1 is a diagrammatic representation of a conventional system 100 for providing device management on a network 110. In the example of FIG. 1, network 110 is a fibre channel storage area network ("SAN") that connects hosts 111 and 112 to storage devices 113, 114, 115. Each host and storage device can generally include processors, memory, input/output devices, storage devices and a network adapter as well as other computer components. In addition to communicating over SAN 110, the hosts and target devices can be connected over LAN 120.

In conventional SAN architectures, the storage devices are typically storage devices or libraries such as tape drives, disk subsystems, and optical storage libraries (e.g., tape drive 113, disk subsystem 114 and media library 115). Hosts can read/write data to/from the storage devices over a fibre channel SAN. While data transfer for storage purposes usually occurs over SAN 110, transfer of device management data typically occurs over LAN 120.

For device management, each storage device typically has its own device management client, which runs on a host or at a dedicated computer, to receive and process device management data from the device. To provide device management support to each of the storage devices, a separate management client must typically run for each device or, at least, each set of devices using a particular device management protocol. For example, host 111 can run management client 131 to manage tape drive 113, management client 132 to manage disk sub-system 114 and management client 133 to manage media library 115. Alternatively, a management client can be run as a framework program that allows for plug-ins for management of each storage device.

Figure 2:
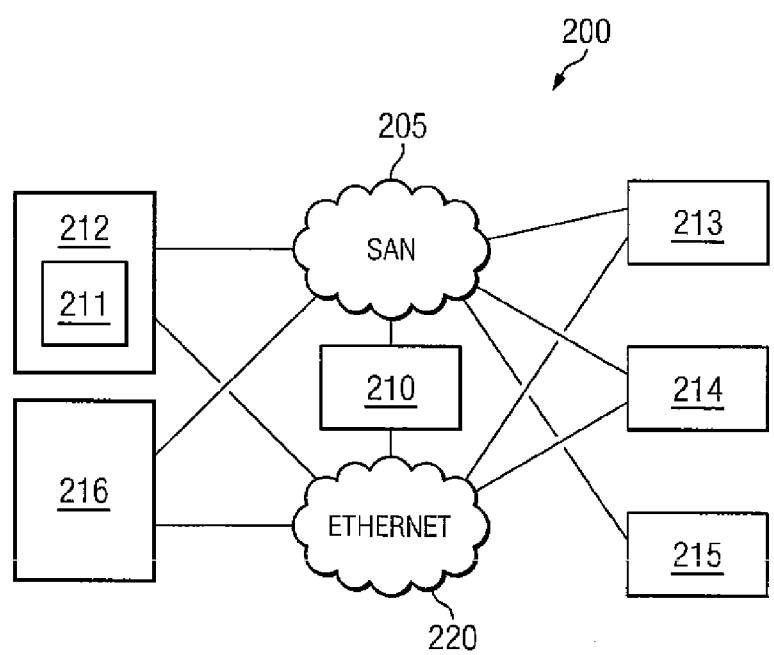
FIG. 2 is a diagrammatic representation of a system for providing device management on a network according to one embodiment of the present invention.

FIG. 2 is a diagrammatic representation of one embodiment of a system 200 for device management on a network 205 that uses a management device 210 to gather device management data from devices according to various protocols and provide the device management data to a management client 211 (e.g., running on host 212) according to a predefined protocol supported by management client 211 (the "defined protocol"). Management device 210 provides mapping between the device management protocols supported by the various devices on network 205 and/or network 220 and the device management protocol supported by device management client 211. This is different than the system of FIG. 1 because a single management client supporting one or a limited number of device management protocols can manage devices that use any number of different device management protocols.

Network 205 can be an IP network, a fibre channel network, the Internet, a LAN, a wireless network or other network known in the art and can connect a number of network devices such as target devices 213, 214, 215 and hosts 212 and 216. Management device 210, hosts 212 and 216 and target devices 213, 214 and 215 can generally include processors, memory, input/output devices, storage devices and a network adapter as well as other computer components. In addition to communicating over first network 205, the hosts and target devices can be connected over second network 220 (e.g., an IP network, a fibre channel network, the Internet, a LAN, a wireless network or other network known in the art). In the example of FIG. 2, target device 213 and target device 214 are connected to both network 205 and network 220, whereas target device 215 is connected to just network 205. Network 205 and network 220 can include additional devices such as routers, bridges and switches for data traffic.

For the sake of example, network 205 can be fibre channel SAN 205 and network 220 can be a LAN 220. In this embodiment of the present invention, the target devices can be storage devices or libraries such as tape drives, disk drives, media libraries or other SAN storage devices known in the art (e.g., tape drive 213, disk sub-system 214 and media library 215). Host 212 can run management client 211 to provide device management to the storage devices. Hosts 212 and 216 can read/write data to/from the storage devices over SAN 205 for data storage purposes. Device management data, on the other hand, can be transported across SAN 205 or LAN 220 depending on the device management protocols supported by management client 211 and the storage devices.

The storage devices can communicate device management data using various protocols such as, for example, T10 based protocols, simple network management protocol ("SNMP"), common interface method ("CIM") based protocols, proprietary protocols, in-band SNMP encapsulation, SCSI command descriptor blocks ("CDB") or other protocols known in the art. The use of SCSI CDBs, along with a SCSI management information base ("MIB") for T10 devices allows management device 210 to route management data for all attached storage devices. Management data for various protocols, including, but not limited to, IP, fibre channel, iSCSI and SCSI, can be delivered using SCSI CDBs (e.g., SCSI service delivery).

According to one embodiment of the present invention, management client 211 can be configured to provide management device 210 with a defined management protocol that management client 211 can use to receive device management data. In other words, management client 211 can specify to management device 210 the management protocol or protocols that management client 211 understands. The defined management protocol can be any device management protocol including, but not limited to, T10 based protocols, SNMP over IP, CIM over IP, SCSI CDB based protocols and proprietary protocols (e.g., IBM AS400 management protocol).

Management device 210 can facilitate device management by determining the device management protocol associated with each storage device known to management device 210 and mapping the management protocols associated with the storage devices to the defined device management protocol(s) used by device management client 211. Additionally, management device 210 can gather device management information from each known storage device and provide the device management data to device management client 211 according to the defined device management protocol.

To determine the management protocol associated with each storage device and gather device management data from the storage devices, management device 210 must be able to locate the devices. Therefore, management device 210 can be configured to maintain knowledge of the location of the storage devices on SAN 205. For each storage device connected to SAN 205 and/or LAN 220, management device 210 can maintain an address for each device on one or both of the networks. In the example of FIG. 2, management device 210 can maintain a fibre channel SAN address and TCP/IP address for tape drive 213 and disk sub-system 214 as each is connected to both SAN 205 and network 220 and can maintain a fibre channel SAN address for media library 215 as it is only connected to SAN 205.

Management device 210 can obtain knowledge of the location of each device through any device discovery method known in the art. For example, if network 205 is a fibre channel SAN, management device 210 can be configured to have access to switches and MIBs to perform device discovery. For devices connected to both SAN 205 and LAN 220, both the SAN address and Ethernet address are typically discoverable through known fibre channel and/or TCP/IP discovery methods. In another embodiment of the present invention, location knowledge can be exported to the management device. Device location information can be maintained as a table, database record, file or in any suitable data storage format.

For each storage device for which management device 210 knows the location, management device 210 can determine an associated device management protocol and can gather device management data from each known device. In one embodiment of the present invention, management device 210 can send command inquiries to the known devices using management commands according to various device management protocols to determine the associated device management protocol. This can be an iterative process in which management device 210 begins by sending out management commands in a base level protocol and then moves to more sophisticated protocols. For each device that responds to a command inquiry according to a particular protocol, management device 210 can associate that device with the particular protocol.

As an example, management device 210 can first send management commands to storage devices 213, 214 and 215 using base level storage T10 management commands. If any of the storage devices respond, management device 210 can associate the responding devices with a T10 protocol. Thus, for example, if media library 215 responds to the T10 based management command, management device 210 can associate media library 215 with that protocol. If each known device does not respond, management device 210 can send out an inquiry in other device management protocols such as IP based SNMP, IP based CIM and so on through a set of protocols until management device 210 determines which, if any, management protocol should be associated with each device. Management device 210 can apply the different management protocols in any order. It can be more efficient, from a layering perspective, however, to begin with in-band protocols such as T10 based protocols and then move to out-of-band protocols.

Management device 210 can gather management data from each device according to the device management protocol associated with that device. The device management data can be received in response to the initial command inquiry that establishes the protocol to be associated with a particular device. For example, if tape drive 213 supports SNMP as a device management protocol and management device 210 sends an SNMP GET command as the SNMP command inquiry to determine with which device management protocol tape drive 213 is associated, tape drive 213 will respond to the command inquiry with a variety of device management data (e.g., manufacturer, size, speed and other device management information known in the art). Because tape drive 213 responded to the command inquiry with device management data, management device 210 is able to both associate tape drive 213 with SNMP and gather device management data. If additional device management data needs to be gathered after the initial response, according to a particular implementation, management device 210 can send additional management commands.

According to one embodiment of the present invention, management device 210 can map the protocols associated with each storage device to the defined device management protocol used by device management client 211 and, based on these mappings, convert device management data received from the storage devices to a format usable by device management client 211. For example, if the device management client 211 is configured to receive device management data according to SNMP 3.1 over LAN 220, but media library 215 communicates management data according to a T10 fibre channel protocol over SAN 205, management device 210 can receive management data from media library 215 according to the T10 based protocol, translate the management data from the T10 based protocol to SNMP 3.1 and communicate the management data to device management client 211 over network 220. In the reverse direction, management device 210 can translate management data and commands received from device management client 211 from SNMP 3.1 to a T10 based protocol and send the commands to media library 215 over a fibre channel connection (e.g., via network 205).

It should be noted that in the embodiment of FIG. 2, management device 210 can be a centralized management device. In other words, management device 210 can facilitate device management for all the devices on SAN 205. In other embodiments of the present invention, the functionality of management device 210 can be distributed among one or more additional management devices.

The system of FIG. 2 provides advantages over that of FIG. 1 in that only one device management client is required. The device management client can look to one source (i.e., management device 210) to gather device management data from devices supporting various device management protocols. Thus, management device 210 can enable a device management client operating according to a particular device management protocol to receive device management data from storage devices operating according to other device management protocols.

Figure 3:
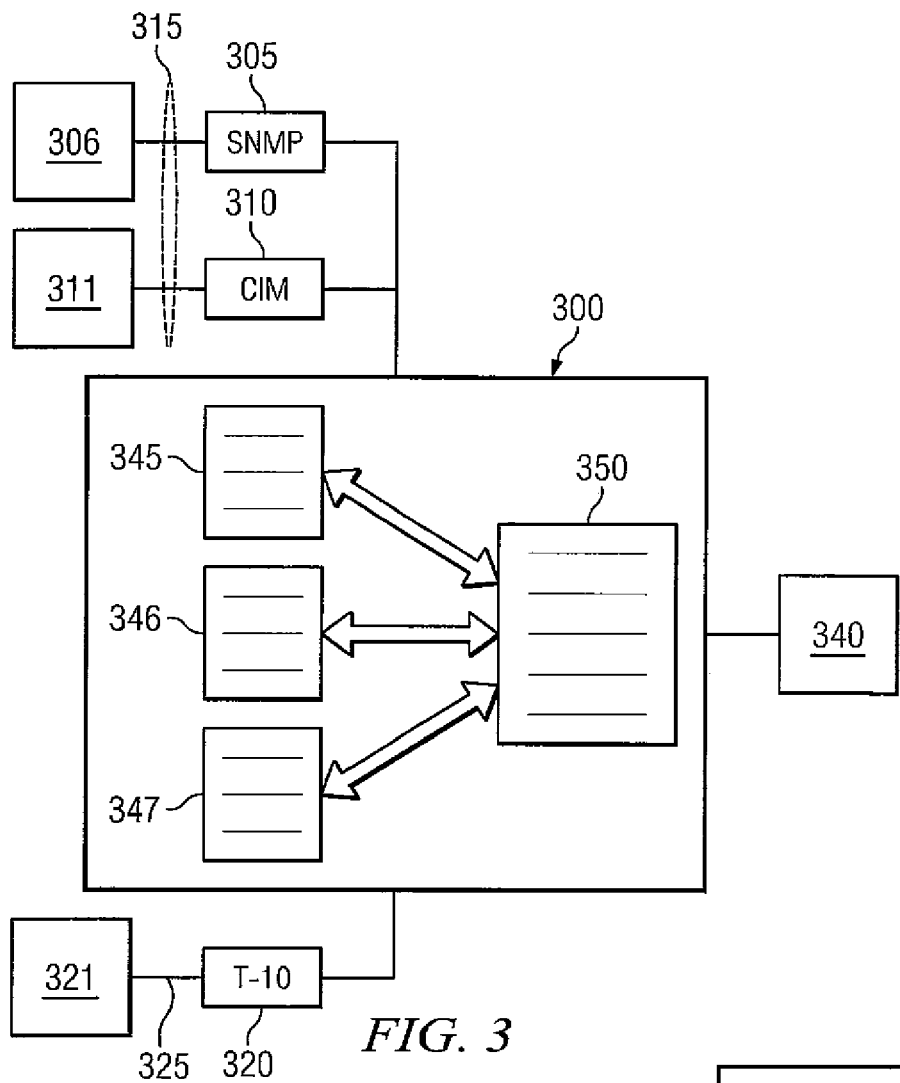
FIG. 3 is a diagrammatic representation of device management according to one embodiment of the present invention.

A management device (e.g., management device 210) can facilitate device management by mapping management protocols associated with the storage devices to a defined device management protocol used by a management client. FIG. 3 is a block diagram illustrating one embodiment for protocol mapping at a management device 300. Management device 300 can receive device management data from storage devices on a SAN according to various device management protocols. In the example of FIG. 3, management device 300 can receive SNMP data 305 from storage device 306 and CIM data 310 from storage device 311 over a TCP connection 315 (e.g., an Ethernet connection) and T10 data 320 from storage device 321 over a fibre channel connection 325 (e.g., over a fibre channel SAN). A storage device can send management data to management device 300 in response to a management command sent by management device 300, in response to the occurrence of a predefined event at the storage device or in response to any other event for which management data can be sent.

In one embodiment of the present invention, device management client 340 can be configured to prompt management device 300 to gather device management data from known devices on the network including storage devices and/or other devices. Management device 300 can send management commands to the known devices to determine, which, if any, management protocol each device supports. If a device responds to a management command in a particular protocol, management device 300 can associate the device with that protocol. For example, if device 306 responds to an SNMP GET command, management device 300 can accordingly associate device 306 with SNMP. The associations between devices and protocols can be stored as tables, database entries or in any other data storage format known in the art.

Based on the device management data received from a each storage device, management device 300 can build a table, or other data structure. For example, management device 300 can build table 345 for storage device 306, table 346 for storage device 311 and table 347 for storage device 321. Each table can include information to define the corresponding storage device according to the associated protocol. Thus, for example, table 345 can include the information to define storage device 306 according to the SNMP protocol used by device 306, table 346 can include the information to define storage device 311 according to the CIM protocol used by device 311 and table 347 can include the information to define storage device 321 according to the T10 based protocol used by device 321. The structure of the tables can be based on the protocol associated with each storage device. While shown as separate tables in FIG. 3, the data management information gathered from the storage devices can be stored as a single table, as files, as database entries or in any other data storage format known in the art.

Management device 300 can contain logic to map the tables containing device management data to a defined management protocol definition 350. Defined management protocol definition 350 can represent how device management client 340 expects to communicate device management data and commands. If, for example, device management client 340 understands device management data according to the SNMP 3.1 protocol, defined management protocol definition 350 can be a table defining the information that should be sent to management client 340 according to that protocol.

Management device 300 can map all or a portion of the device management data in tables 345, 346 and 347 to defined device management protocol definition 350 and send the device management data to management client 340 according to the protocol supported by management client 340. In the example of FIG. 3, when management device 300 receives T10 data 320 from storage device 321, management device 300 can map the data to the defined management protocol according to the respective table 347 and defined management protocol definition 350. Similarly, management device 300 can convert device management data received from device management client 340 in the defined data management protocol (e.g., SNMP 3.1) to a device management protocols associated with the storage devices.

In the example of FIG. 3, storage device 306 sends device management data according SNMP (e.g., SNMP data 305) and device management client 340 receives data according to SNMP. In one embodiment of the present invention, management device 300 may not maintain a table for storage device 306 and may simply pass device management data through to device management client 340 without manipulation as storage device 306 and client 340 use support a common device management protocol. In another embodiment of the present invention, management device 300 can build table 345 for internal bookkeeping purposes and/or perform other administrative tasks.

Figure 4:
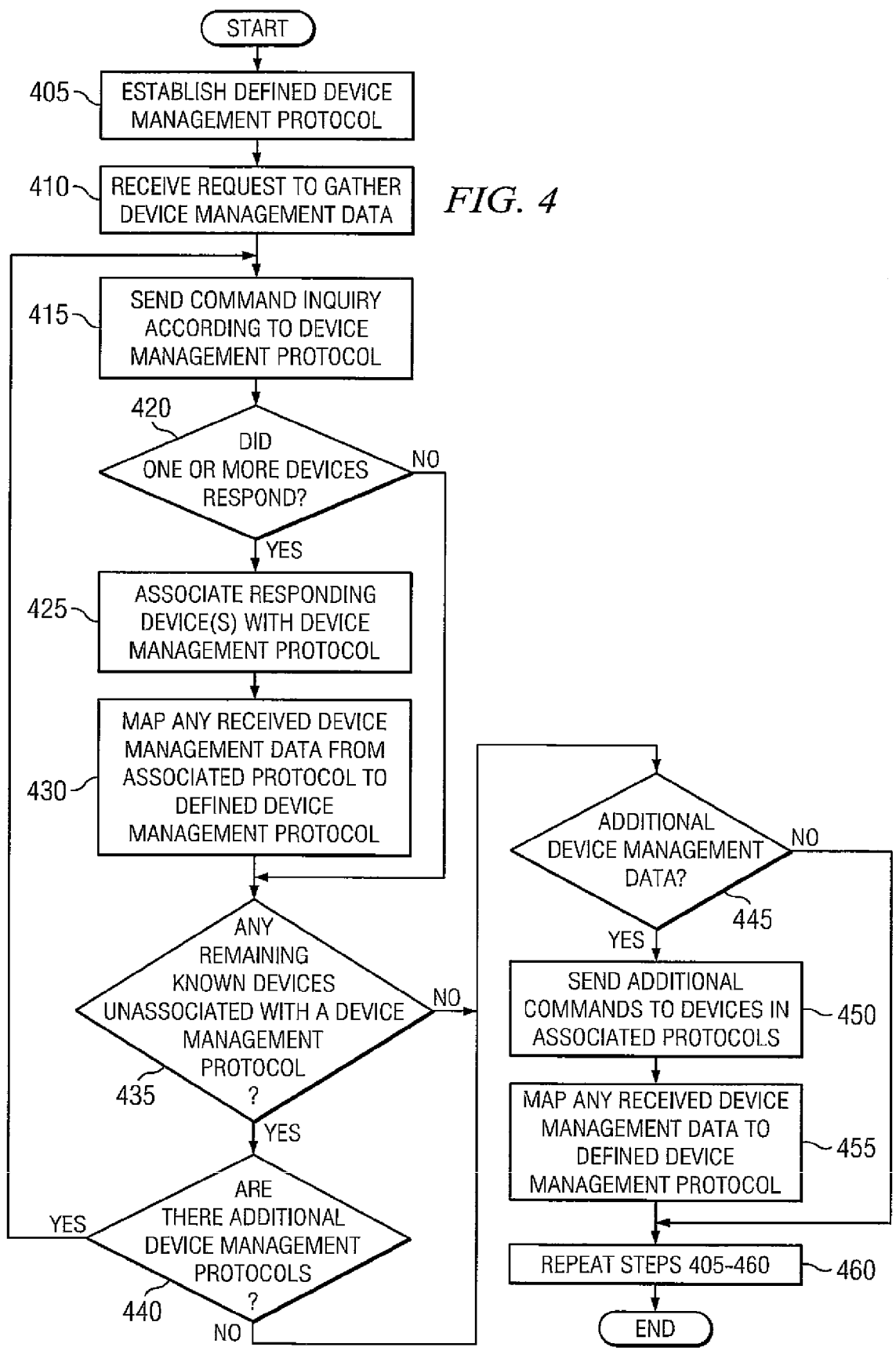
FIG. 4 is a flow chart illustrating one embodiment of a method for providing device management data to a device management client.

FIG. 4 illustrates one embodiment of a method for providing device management data to a device management client according to one embodiment of the present invention. At step 405, a defined management protocol definition can be established at the management device that represents the management protocol used by the device management client to send and receive device management data and commands. The defined management protocol definition can be received from the device management client, can be received from another source or can be established in any other manner as would be understood by those of ordinary skill in the art.

At step 410, the management device can receive a request from the management client to collect device management data from devices known to the management device. The management device, at step 415, can send out a command inquiry according to a first device management protocol to the devices known to it. In one embodiment of the present invention, the first command inquiry can be sent according to an in-band protocol, such as a T10 based protocol.

At step 420, the management device can determine if any devices responded to the command inquiry and, at step 425, can associate the devices that responded with the first device management protocol. Additionally, at step 430, the management device can convert any device management data received according to the first device management protocol to the defined device management protocol for communication to the device management client.

The management device, at step 435, can determine if there are any known devices that remain unassociated with a device management protocol. If there are devices that remain unassociated with a device management protocol, the management device can determine if command inquiries can be sent out according to additional device management protocols (step 440). If there are additional device management protocols that can be tried, the management device can repeat steps 415-440 using each additional device management protocol rather than the first device management protocol to send out command inquiries until either all the known device are associated with a device management protocol or command inquiries have been sent out according to all the device management protocols known to the management device. It should be noted that subsequent command inquiries can be sent out to each known device or only the devices that remain unassociated with a device management protocol. Thus, command inquiries according to a particular protocol can be sent to all or a portion of a set of known network devices. If, at steps 435 and 440, it is determined that there are no unassociated devices and that there are no additional device management protocols under which command inquiries can be sent out, control can pass to step 445.

At step 445, the management device can determine if any additional device management data needs to be gathered. If so, the management device, at step 450, can send additional commands to the known devices in the associated protocol for each device. Any device management data received back can be mapped to the defined device management protocol and can be sent to the device management client (step 455). The methodology of FIG. 4 can be arbitrarily repeated as needed or desired as shown, for example, at step 460.

In the embodiment of FIG. 4, the management device can receive device management data in response to command inquiries sent by the management device to other devices. As would be understood by one of ordinary skill in the art, however, many devices, including storage devices, can send device management data in response to other events. For example, a tape drive can send out an SNMP trap containing device management data when a tape cartridge becomes jammed in the tape drive. The management device can receive this asynchronously generated device management data from the tape drive and map the data from the device management protocol associated with the tape drive to the defined device management protocol used by the device management client. Thus, the management device can continue to gather device management data without issuing a management protocol command.

Figure 5:
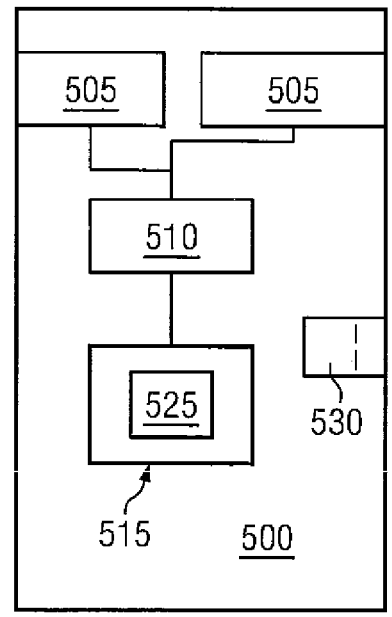
FIG. 5 is a diagrammatic representation of a management device according to one embodiment of the present invention.

FIG. 5 illustrates one embodiment of a management device to facilitate device management. Management device 500 can comprise one or more network interface devices 505 (e.g., Ethernet adapter, modem, fibre channel adapter or other network interface device known in the art), a computer processor 510, a computer readable memory 515 (e.g., RAM, ROM, optical storage device, magnetic storage device or other computer readable memory known in the art) and a set of computer instructions 525 executable by computer processor 510. Management device 500 can optionally include additional network interfaces (e.g., network interface 530) to connect to additional networks (e.g., LANs, WANs, wireless networks, fiber channel networks or other networks known in the art). Computer instructions 525 can be implemented as software, hardware or firmware on management device 500 and can be a stand alone program, module of larger program or be implemented in any other suitable programming structure as would be understood by those of skill in the art. While management device 500 is shown as a single device, the functionality of management device 500 can be distributed. Furthermore, while shown as a stand alone device in FIG. 5, management device 500 may comprise part of another device, such as a router, with shared components.

Management device 500, through execution of computer instructions 525, can maintain knowledge of a set of devices on one or more networks and associate each device with a device management protocol. Additionally, management device 500 can receive device management data from the other devices, map the device management data to a defined device management protocol and send the device management data to a device management client in the defined device management protocol.

Embodiments of the present invention have been described with respect to managing storage devices on a SAN with a stand alone management device. However, other embodiments of the present invention can manage any devices that send out device management data on a network. Thus, for example, a management device can provide protocol mapping for IP network devices, fibre channel devices, Internet based devices, wireless devices or any other device supporting device management protocols. Additionally, embodiments of the present invention can support protocol mapping across multiple network architectures (e.g., fibre channel and Ethernet). Embodiments of the present invention can support various device management protocols including, but not limited to, SNMP, CIM, Storage Management Initiative Specification ("SMI-S") protocol, Windows Management Instrumentation ("WMI") protocol, web based enterprise management ("WBEM") protocol, open management protocols, proprietary management protocols and other management protocols known or developed in the art.

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A management device comprising:
   a first network interface device to connect to and to interface with a first network;
   a computer processor coupled to the network interface device;
   a computer readable memory accessible by the computer processor, wherein the computer readable memory contains computer instructions executable by the processor to:

maintain knowledge of a plurality target network devices on the first network;

maintain knowledge of a defined device management protocol supported by a device management client running on a host device;

for each of the target network devices on the first network for which the device management protocol is not known to the management device, determine an associated device management protocol by:

sending command inquiries to the target network devices on the first network according to a plurality of device management protocols in an iterative process; and for each target network device that responds to a command inquiry in a device management protocol, populating a database to associate a responding target network device with the corresponding device management protocol;

map the device management protocols associated with target network in the database to the defined device management protocol supported by the device management client running on the host device;

convert command inquiries received from the device management client according to the mapping from the defined device management protocol to corresponding device management protocols associated with each of the target network devices in the database; and convert device management data received from each of the network target devices according to the corresponding network management protocols to a format according to the defined device management protocol.

2. The management device of claim 1, wherein the management device further comprises a second network interface connected to the computer processor operable to connect to and interface with a second network.

3. The management device of claim 2, wherein at least one of the one or more command inquiries is sent over the first network and at least one of the one or more inquiries is sent over the second network.

4. The management device of claim 1, wherein the management device is a centralized management device.

5. A management device comprising:

a fibre channel interface device to connect to and interface with a fibre channel network;

an IP interface device to connect to and interface with an IP network;

a computer processor connected to the fibre channel interface device and the IP network interface device;

a computer readable memory accessible by the computer processor, wherein the computer readable memory contains computer instructions executable by the processor to:

maintain knowledge of a set of two or more network devices on the fibre channel network;

maintain knowledge of a defined device management protocol supported by a device management client running on a host device;

determine an associated device management protocol for each network device in the set of network devices for which the device management protocol is not known to the management device, wherein determining the associated device management protocol for each network device in the set of network devices comprises:

iteratively sending command inquiries according to a plurality of device management protocols to the set of network devices; and associating in the database any of the set of network devices that is responsive to a command inquiry according to a device management protocol with the corresponding device management protocol;

map the corresponding device management protocols associated with network devices in the database to defined device management protocol supported by a device management client on the IP network;

convert command inquiries received from the device management client according to the mapping from the defined device management protocol to the associated device management protocols associated with each of the target network devices in the database; and convert device management data received from each of the network target devices according to the associated device management protocols to a format according to the defined device management protocol.

6. The management device of claim 5, wherein the computer instructions are further executable to send the command inquiries via the fibre channel network.

7. The management device of claim 5, wherein the computer instructions are further executable to send the command inquiries via the IP network.

8. The management device of claim 5, wherein the plurality of device device management protocols comprise at least one of a T10 based protocol, SNMP, or a CIM based protocol.

9. The management device of claim 5, wherein the computer instructions are executable to send at least a portion of the command inquiries according to the plurality of device management protocols via the fibre channel network and at least another portion of the command inquiries according to the plurality of device management protocols via the IP network.

10. A method of device management comprising:

providing a set of two or more network device and a management device coupled to the set of the network devices, wherein the set of network devices are coupled to the management device by one or more networks;

at the management device:

maintaining knowledge accessible by the management device of the network devices on the network;

maintaining knowledge accessible by the management device of a defined device management protocol supported by a device management client running on a host device;

sending command inquiries to the network devices according to a plurality of device management protocols for which the device management protocol is not known on the network according to one or more device management protocols;

for each network device;

determining a device management protocol supported by each network device according to which of the command inquires the network device responds, and populating one or more database tables to associate each network device with a supported device management protocol;

mapping the device management protocols associated with the network devices to the defined device management protocol supported by the device management client running on the host device;

converting command inquires received from the device management client according to the mapping from the defined device management protocol to the associated device management protocols; and converting device management data received from the network devices according to the associated device management protocols to a format usable by the device management client operating according to the defined device management protocol.

11. The method claim 10, further comprising sending the command inquires from the management device inquiry via a fibre channel network.

12. The method of claim 10, further comprising sending the command inquiries from the management device via an IP network.

13. The method of claim 10, wherein the plurality of device management protocols comprises one of a T10 based protocol, SNMP, or a CIM based protocol.

14. The method of 10, further comprising: associating each of a set of network devices with a particular device management protocol according to which of the command inquires each network device responds, wherein each of the one or more command inquiries is sent to a plurality at least a portion of the set of network devices.

15. The method of claim 14, further comprising sending at least a portion of the command inquiries via a fibre channel network and at least another portion of the one or more command inquiries via an IP network.

16. The method of claim 10, further comprising:

receiving a prompt from a device management client to gather device management data;

receiving device management data from a set of network devices on a network according to the associated device management protocols;

mapping the device management data from the associated device management protocols to the defined device management protocol; and sending the device management data to the device management client according to the defined device management protocol.

\* \* \* \* \*